United States Patent [19]

Soter

[11] 4,067,425
[45] Jan. 10, 1978

[54] CLUTCH APPARATUS

[76] Inventor: Paul Joszef Soter, 2168 East 61 Avenue, Vancouver, British Columbia, Canada, V5P 2V3

[21] Appl. No.: 708,559

[22] Filed: July 26, 1976

[51] Int. Cl.² ........................................... F16D 43/284
[52] U.S. Cl. .................................. 192/91 A; 192/76; 192/93 C; 192/103 B
[58] Field of Search ............... 192/91 A, 93 C, 103 B, 192/103 F, 105 BA, 76

[56] References Cited
U.S. PATENT DOCUMENTS

| 696,284 | 3/1902 | Vivinus | 192/93 C X |
| 2,077,292 | 4/1937 | Waseige | 192/103 F |
| 2,083,906 | 6/1937 | Grimm | 192/103 B X |
| 2,278,556 | 4/1942 | Osterholm | 193/93 C |
| 2,534,133 | 12/1950 | Kirkpatrick | 192/105 BA |

Primary Examiner—Benjamin W. Wyche
Attorney, Agent, or Firm—Carver and Company

[57] ABSTRACT

Clutch apparatus having a drum having an inner annular clutching face adapted to be secured to the crank shaft of an engine for rotation therewith. A hollow drive shaft centered within the drum carries a plurality of radially movable clutch shoes which are normally urged inwards to a disengaged position by means of an annular tension spring and are moved radially outwards against the tension spring by means by a linearly movable conical wedge which is grooved to accept rounded-ended stems extending from each of the clutch shoes and which is normally spring-urged into engagement with the shoe stems to move the shoes into clutching engagement with the drum against the action of the coil spring. The conical wedge is operatively connected to a piston which rides in the hollow drive shaft into which a pressurized fluid is injected to operate the piston and move the wedge out of engagement with the shoe stems to enable the tension spring to move the shoes radially inwards out of engagement with the clutch drum.

2 Claims, 3 Drawing Figures

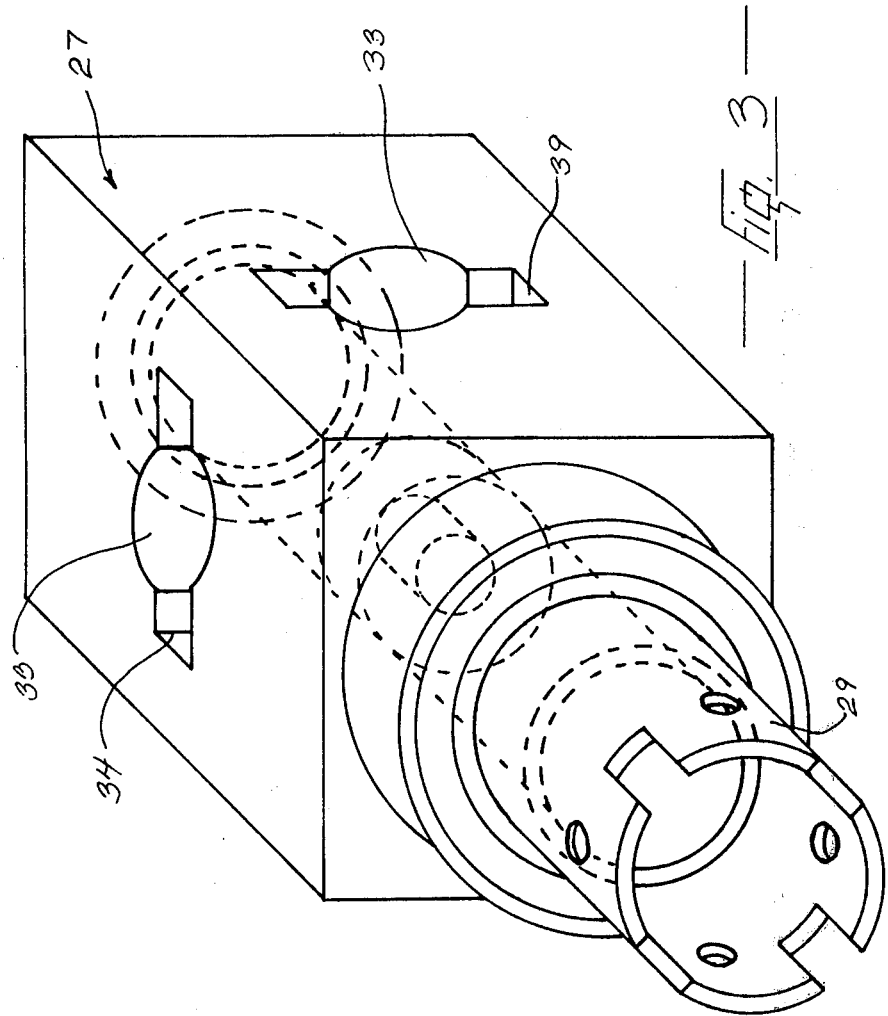

CLUTCH APPARATUS

BACKGROUND OF THE INVENTION

1. Field of the Invention

This invention relates to friction clutches and in particular to friction clutches having radially displaceable clutch shoes.

2. Prior Art

In operation of friction clutches, particularly automobile clutches, many people experience great difficulty in obtaining a smooth start from a stop position, due to their inability to operate the clutch to provide decreasing slippage between the clutch members and the clutch plate as the automobile accelerates. There have been some attempts to overcome this problem by providing clutch assemblies having radially movable clutch shoes which can be operated by an axially movable wedge into an out of clutching engagement with the clutch drum which is connected to the engine crank. Although radially applied clutch assemblies of the prior art have been fairly successful, automobile drivers, particularly beginners, still find smooth operation of the clutch assembly rather difficult.

SUMMARY OF THE INVENTION

The present invention provides a clutch assembly of the last-mentioned type which greatly diminishes the problems inherent in obtaining a smooth start from a stop position.

The present clutch assembly takes advantage of the effect of centrifugal forces as the automobile accelerates from a standing position, to obtain a gradually increasing frictional engagement between cooperating clutch parts, thus minimizing the tendency towards the jerkyness in clutch application.

The present clutch assembly comprises a clutch drum having an interior cylindrical clutch face adapted to be secured to the crank shaft of an engine for rotation therewith, a drive shaft rotatable within the clutch drum, a plurality of radially movable clutch shoe carriers mounted on the drive shaft, tension spring means interconnecting the clutch shoe carriers for yieldably maintaining the carriers in a normal contracted position against the drive shaft, a cone-shaped wedge movable axially into engagement with the clutch shoe carrier for spreading the latter radially outwards against the action of the tension spring means, a clutch shoe mounted on each carrier for limited radial movement relative thereto being adapted to frictionally engage the clutch face of the drum when the carriers are spread by the wedge and compression spring between each shoe and its associated carrier for urging each shoe to a normal extended position relative to its associated carrier and being adapted to yield to enable radial inward movement of the shoe relative to the carrier when each shoe engages the clutching surface of the drum.

A detailed description following, related to the drawings, gives exemplification of apparatus according to the invention which, however, is capable of expression in means other than those particularly described and illustrated.

DESCRIPTION OF THE DRAWINGS

FIG. 3 is an isometric view of a portion of drive shaft.

DETAILED DESCRIPTION

Figure 1:
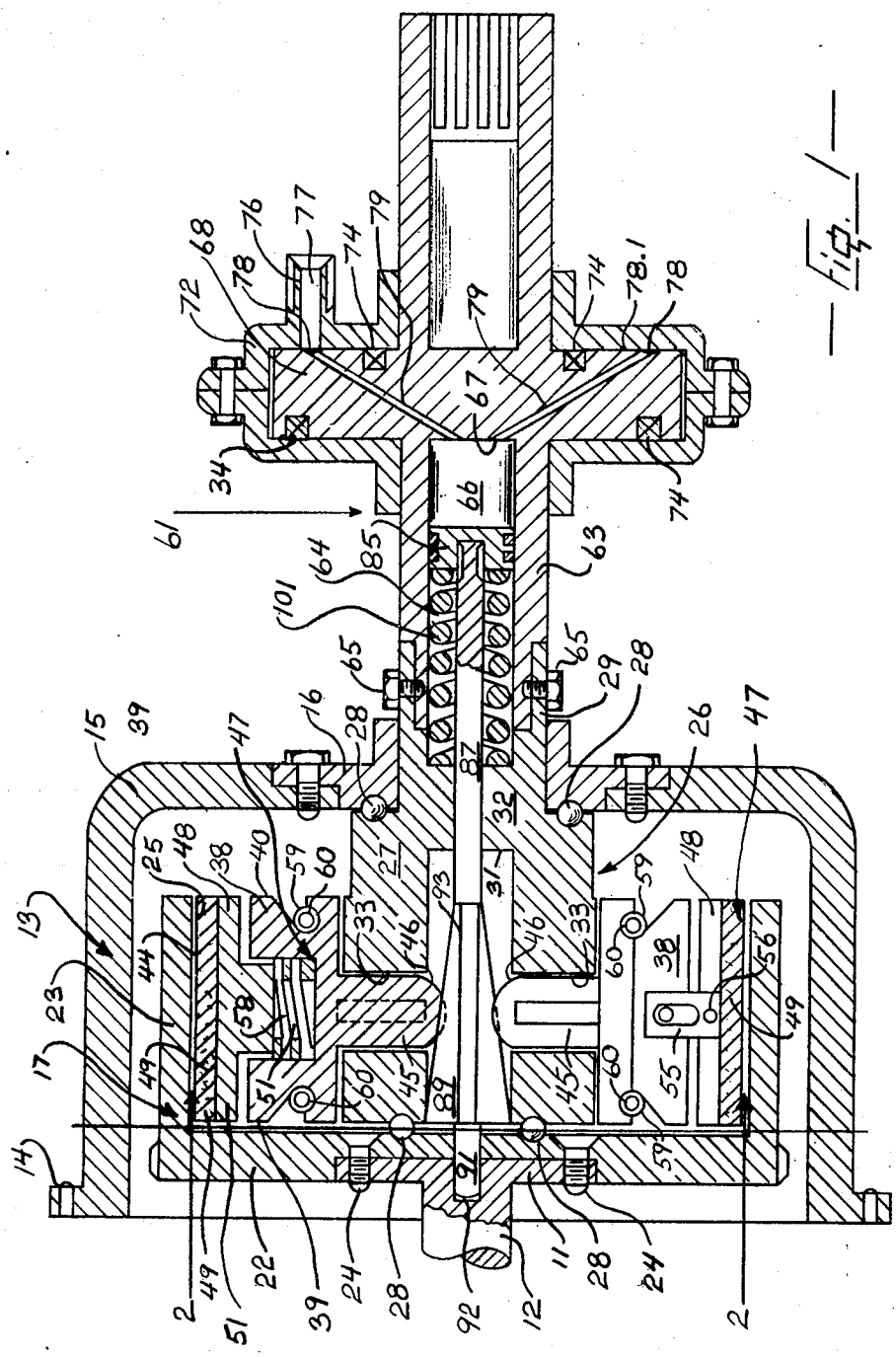
FIG. 1 is a longitudinal sectional view of the clutch assembly of the invention.

Referring to the drawings and in particular to FIG. 1, a clutch assembly, generally 10, of the invention is shown in position at a flanged end 11 of a crank shaft 12 of an automobile engine (not shown). The assembly has a housing 13 having an annular flange 14 by means of which the housing can be bolted to the engine block. The housing has an annular end wall 15 to which an annular bearing plate 16 is secured.

A cylindrical clutch drum 17 having a circular end wall 22 and a cylindrical side wall 23 is secured to the flanged end 11 of the crank shaft by machine bolts 24 extending through the end wall. The inner surface of the side is machined to provide a clutch face 25. As shown, the clutch drum is heavy construction so that it also serves as a fly-wheel for the engine.

The housing and the clutch drum rotatably support a drive shaft assembly 26. The drive shaft assembly has a head portion 27 which is of square cross-sectional configuration in the transverse plane and which is journalled for rotation by bearings 28 fitting between its fore and aft ends and the end wall 22 of the clutch drum and the bearing plate 16. The head portion has a splined tubular aft end portion 29 which extends through the bearing plate. A cylindrical, axially-extending bore 31 is formed in the head portion 27 and opens forwardly towards the crank shaft. The bore is closed at its other end by an apertured wall 32 which separates the socket from the tubular end portion 29.

As shown in FIGS. 1 and 3, a radial passage 33 extends through each side wall of the head portion of the drive shaft assembly, each of the passages 33 intersecting the bore 31. The passages are cylindrical and have diametrically opposed key-ways 34.

Figure 2:
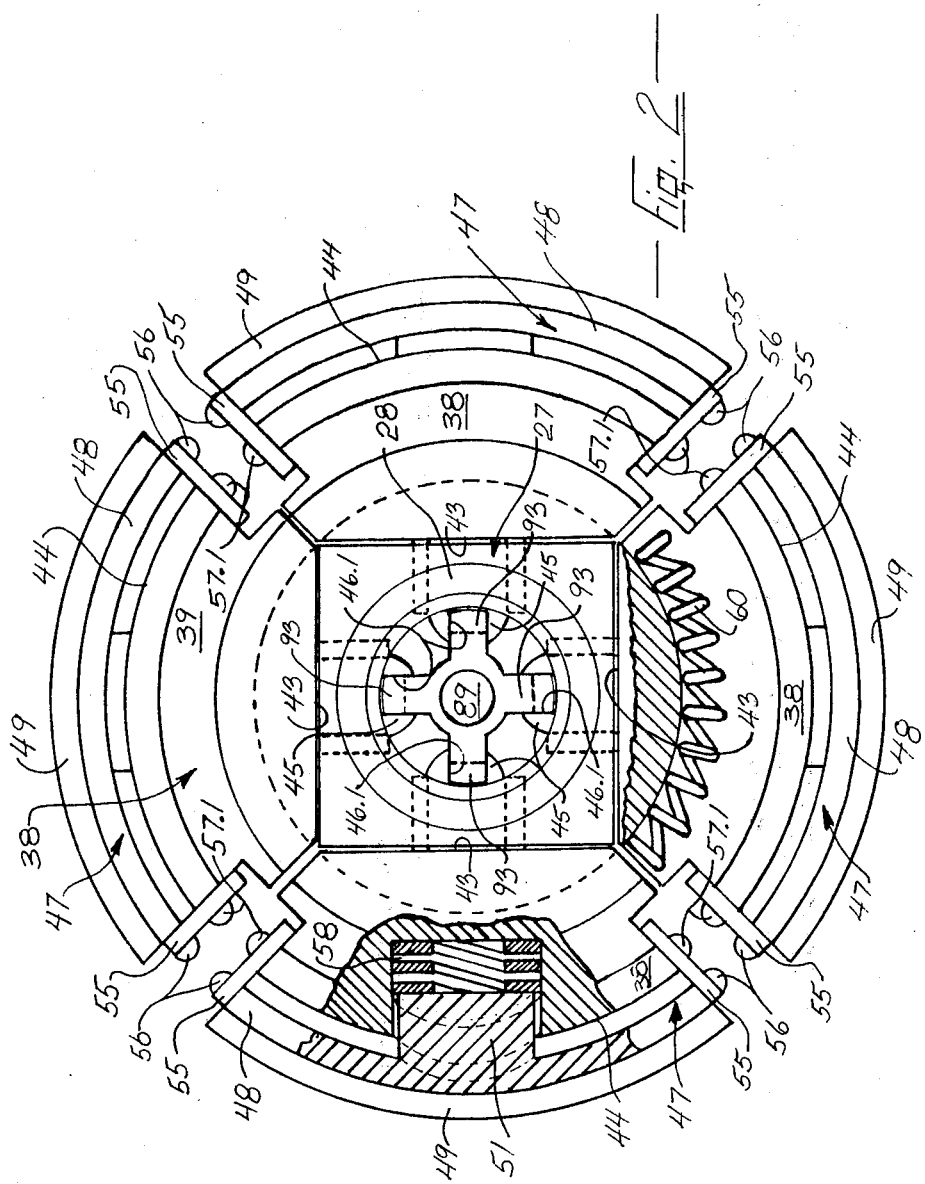
FIG. 2 is a sectional view taken on Line 2—2 of FIG. 1 with portions broken away for the purposes of clarity.

Referring to FIGS. 1 and 2, the head portion of the drive shaft carries four clutch shoe carriers 38. Planar front and rear end surfaces 39 and 40, respectively, which have a flat inner base surface 43 and an arcuate peripheral surface 44. A pintle 45 extends radially from the base surface of each of the carriers. The pintles have a slidable fit in radial passages 33 so as to permit radial movement of the carriers relative to the head portion of the drive shaft. The inner ends 46 of the pintles are rounded and extend into the axial bore 31, said inner ends are provided with fore and aft extending slots 46.1, shown on FIG. 2.

Each of the carriers supports a clutch member 47, each clutch member having an arcuate shoe 48 to the peripheral surface of which is bonded a friction lining 49. A pintle 51 extends radially inward from each shoe and slidably extends into a radial socket 53 opening out of the arcuate peripheral surface of each of the carriers. Slotted connectors 55 are secured by rivets 56 to opposite ends of each shoe for slidable engagement with the shank of a rivet 57 extending from the ends of the associated carriers so as to provide limited radial movement of each shoe relative to its associated carrier. Each shoe is urged to a normal extended position relative to its associated carrier by a compression spring 58 which fits in each carrier socket.

The front and rear end surface of each carrier has an arcuate groove 59 and annular tension springs 60, shown partially only in FIG. 2, fit in the grooves for yieldably maintaining the carriers in a normal compressed condition against the head portion of the drive shaft.

The tubular aft end portion 29 of the drive shaft has a driving connection with a tail assembly 61. The tail shaft assembly has a cylindrical stem 63 having a cylindrical forwardly opening axial bore 64. The forward end of the stem 63 has a spline connection with the aft end portion 29 of the drive shaft and is secured against axial movement thereto by machine screws 65. The bore, it is seen, forms a piston chamber having a head end 67. The stem terminates in the radially extending disc-like flange 68. A split casing 72 encloses the flange and the flange is provided with annular sealing elements 74 which sealably engage the casing wall. The casing has a fluid fitting 76 having a fluid passage 77 which confronts an annular groove 78 formed in the end surface 78.1 of the flange. Fluid passages 79 extend through the flange between the annular groove 78 and the chamber 66. The casing 72 is normally non-rotatably secured to the automobile frame-work or if the clutch assembly is used in a stationary engine it can be non-rotatably supported on suitable frame-work. In use a fluid feed line is connected to the fitting to enable pressurized fluid to be emitted into or discharged from the piston chamber.

A piston 85 fits in the chamber 66 and has a piston rod 87 which extends through the annular wall 32 and into the bore 31. The forward end of the piston rod terminates in a conical wedge 89 which is slidable within the bore 31 and a pin 91 extends from the base of the wedge slidably into a socket 92 in the flanged end 11 of the crank-shaft. The wedge is formed of four sloped fins 93 which slidably fit in the slots 46.1 of the pintles.

An actuating compression spring 101 fits in the piston chamber between the piston 85 and the end wall 32 normally urging the piston rod to move aft so as to move the conical wedge in aft direction so as to spread the clutch shoe carriers, against the action of the annular tension springs 60, which thus moves the clutch shoes radially outwards into engagement with the clutch drum. When fluid under pressure is delivered into the fluid chamber, the piston is moved in the opposite direction against the action of the actuating spring to enable the shoe carriers to be moved inwards by the annular tension springs and thus disengage the shoes and the drum.

In operation of the clutch assembly of the present invention, the shoes are normally disposed in the non-engaged position by admitting pressurized fluid to the piston chamber so as to move the conical wedge forwards and allow the tension spring to move the clutch shoe carriers and with them the clutch shoes to a disengaged position clear of the clutch drum. To engage the clutch, fluid is released from the chamber 66 to allow the actuating spring to move the conical cam into spreading engagement with the shoe carriers until the shoes make contact with the rotating clutch face 25 of the drum.

To engage the clutch, fluid is released from the piston chamber 66 so as to allow the actuating spring to move the conical wedge into spreading engagement with the shoe carriers so as to move the shoes into engagement with the rotating clutch face of the clutch drum, thus compressing the clutch shoe springs. Release of fluid from the piston chamber is stopped when shoe pressure against the rotating drum builds up sufficiently to start the drive shaft rotating. As the drive shaft rotates centrifugal force on the shoes increases shoe pressure against the clutch drum thus decreasing slippage and increasing drive shaft speed until shaft speed reaches engine speed at which point the piston chamber can be totally depressurized to allow the full force of the actuating spring to be applied through the mediacy of the wedge against the clutch drum so as to lock the latter in driving engagement with the clutch drum.

I claim:
1. A friction clutch assembly comprising:
   a. a clutch drum having an interior cylindrical clutch face adapted to be secured to the crank shaft of an engine for rotation therewith,
   b. a drive shaft rotatable within the clutch drum,
   c. a plurality of radially movable clutch shoe carriers mounted on the drive shaft, each carrier having an inwardly extending radially aligned pintle,
   d. tension spring means interconnecting the clutch carriers for yieldably maintaining the carriers in a normal contracted position against the drive shaft,
   e. an axially movable cone-shaped wedge having grooves for slidably receiving inner ends of the pintles,
   f. a clutch shoe mounted on each carrier for limited radial movement relative thereto being adapted to frictionally engage the clutch face of the drum when the carriers are spread by the wedge,
   g. a compression spring between each shoe and its associated carrier urging each shoe to a normal extended position relative to its associated carrier being adapted to yield to enable radial movement of each shoe relative to its carrier when each shoe engages the clutching surface of the drum.
2. The clutch assembly as claimed in claim 1 in which the drive shaft has an axially extending chamber, a piston in the chamber having a piston rod connected to the wedge, a piston actuating compression spring in the chamber urging the piston in a direction to move the wedge into spreading engagement with the carrier pintles, means for directing a pressurized fluid into and out of the chamber for moving the piston against the piston actuating compression spring so as to move the wedge out of engagement with the carrier pintles and thereby disengage the clutch shoes from the drum.

* * * * *